United States Patent
Wakamatsu et al.

[11] 3,745,461
[45] July 10, 1973

[54] DEVICE FOR MEASURING SPEED OF ROTATION INCLUDING A CIRCUIT FAILURE DETECTOR

[75] Inventors: Hisato Wakamatsu, Kariya-shi; Tokuhiro Kurebayashi, Oobu-shi, both of Japan

[73] Assignee: Nippondenso Co., Ltd., Aichi-ken, Japan

[22] Filed: May 5, 1972

[21] Appl. No.: 250,655

[30] Foreign Application Priority Data
May 6, 1971 Japan................................ 46/29970

[52] U.S. Cl. ................................ 324/174, 340/253
[51] Int. Cl. ............................................. G01p 3/48
[58] Field of Search................................. 317/5, 19; 303/21 EB, 21 CF, 21 CG, 21 P, 21 AF; 188/181 C; 246/182 B, 182 C; 180/105 E; 324/161, 162, 166, 173, 174; 340/263, 253 B, 253 Q

[56] References Cited
UNITED STATES PATENTS
2,762,464  9/1956  Wilcox.................................... 317/5
3,527,986  9/1970  Darrow................................... 317/5
3,559,064  1/1971  Grundy.............................. 324/173

*Primary Examiner*—Michael J. Lynch
*Attorney*—John W. Malley et al.

[57] ABSTRACT

A device for measuring speed of rotation comprising an a.c. tachometer generator and an oscillator which oscillates in synchronism with the output of the generator when the generator is in operation and which oscillates at its free-running frequency when the generator is not in operation. In the device, means are provided for forcedly ceasing the oscillation of the oscillator in the event of occurrence of disconnection or short-circuit of the power generating coil of the generator, and a detector detects the de-energization of the oscillator.

1 Claim, 3 Drawing Figures

DEVICE FOR MEASURING SPEED OF ROTATION INCLUDING A CIRCUIT FAILURE DETECTOR

BACKGROUND OF THE INVENTION

1. Field of the Invention

This invention relates to improvements in a device for measuring speed of rotation for use in automotive vehicles and the like.

2. Description of the Prior Art

Known devices for measuring speed of rotation heretofore used for the detection of the speed of automotive vehicles include generally a d.c. generator responsive to the revolutions of a rotary shaft in the wheel driving system of the vehicle and the d.c. output of the d.c. generator is detected and converted into an amount which is representative of the revolutions of the rotary shaft. However, the conventional device employing such a generator has been defective in that the output voltage of the d.c. generator relative to the revolutions of the input shaft is unstable and variable depending on variations in the resistance of the power generating coil and in the permeability of the magnetic material forming the rotor due to temperatures. Other factors giving rise to undesirable variations in the generator output include deviations from the standard dimensions of the air gap portion in the magnetic circuit of the generator depending on the manufacturing technique, and wear on the commutator and brushes of the generator. Further, in the conventional device, means such as a circuit tester has been used for the detection of unusual conditions such as disconnection and short-circuit of the power generating coil in the d.c. generator. However, such a method is defective in that a considerable period of time is required for the inspection, and thus, continuous inspection is difficult to make.

SUMMARY OF THE INVENTION

It is an object of the present invention to provide an improved device for measuring speed of rotation which is free from the prior art defects above described.

Another object of the present invention is to provide a device for measuring speed of rotation comprising a.c. tachometer generator including a power generating coil for generating a voltage signal responsive to the revolution of a rotary member, oscillation means oscillating in sychronism with the output of said generator when said generator is in operation and oscillating at a predetermined free-running frequency when said generator is not in operation, means for de-energizing said oscillation means in the event of occurence of a disconnection or short-circuit trouble with the power generating coil in said generator, and means for detecting the appearance or disappearance of the oscillation output from said oscillation means.

According to the present invention having the features set forth in the above, the output of the oscillation means is applied to means such as a speed meter as a revolutions responsive signal when the a.c. tachometer generator is normally operating. On the other hand, when an unusual condition such as a disconnection or short-circuit trouble occurs on the power generating coil of the generator, the oscillation means is de-energized immediately so that the disconnection or short-circuit trouble can be detected by the detecting means. Further, occurrence of such a disconnection or short-circuit trouble can be detected by the detecting means even when the a.c. tachometer generator is not in operation.

DESCRIPTION OF THE PREFERRED EMBODIMENT

The structure and operation of a preferred embodiment of the present invention will now be described with reference to the accompanying drawings. This embodiment is adapted for detecting the running speed of a vehicle.

Figure 1:
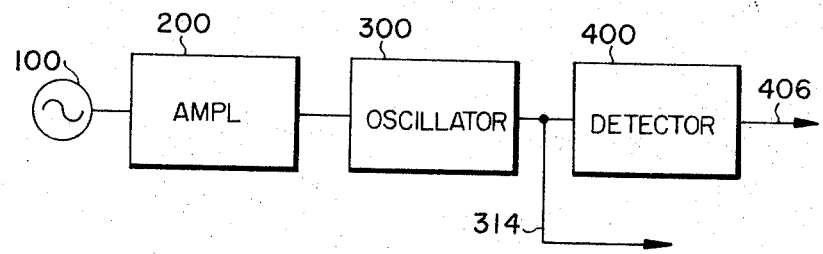
FIG. 1 is a block diagram showing schematically the structure of a revolutions detecting system according to the present invention.

A device for measuring speed of rotation according to the present invention has a general structure as shown schematically in FIG. 1. Referring to FIG. 1, the device comprises an a.c. tachometer generator 100 responsive to the revolutions of a rotary shaft in the wheel driving system of a vehicle, an amplifier 200 for amplifying the voltage generated by the generator 100, an oscillator 300, and a detector 400. The oscillator 300 oscillates at its free-running frequency when the generator 100 is not in operation, while when the generator 100 is in operation, it oscillates at the same frequency as the frequency of the voltage generated by the generator 100 in synchronism with the signal applied from the amplifier 200. The detector 400 detects the appearance or disappearance of the oscillation output from the oscillator 300. Described in more detail, the oscillator 300 oscillates in its free-running condition at a suitable low frequency when the a.c. tachometer generator 100 is not in operation. When, on the other hand, the a.c. generator 100 is placed in operation, the voltage signal generated by the generator 100 is amplified by the amplifier 200 to be applied to the oscillator 300 as a synchronizing signal. In response to the application of the synchronizing signal from the amplifier 200, the oscillator 300 having oscillated at the free-running low frequency oscillates now at the same frequency as the frequency of the voltage signal generated by the a.c. generator 100 in synchronism with the synchronizing signal. The output signal of the oscillator 300 representative of the revolutions of the rotary shaft in the wheel driving system of the vehicle is finally applied to means such as a speed meter by way of an output lead 314. On the other hand, when an unusual condition such as a disconnection or short-circuit trouble occurs on the power generating coil of the a.c. generator 100, the oscillator 300 is forcedly de-energized, and in response to the de-energization of the oscillator 300, the detector 400 detects the occurrence of trouble on the power generating coil of the generator 100. A signal indicative of the occurrence of the disconnection or short-circuit trouble is applied from the detector 400 to means such as an alarm device by way of an output lead 406.

Figure 2:
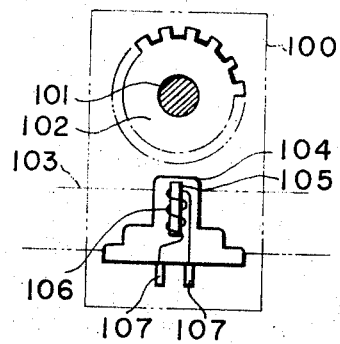
FIG. 2 is a schematic front elevation showing the structure of one form of the revolutions detecting a.c. generator shown in FIG. 1.

The detailed structure of one form of the a.c. tachometer generator 100 is shown in FIG. 2. Referring to FIG. 2, the generator 100 comprises a toothed disc 102 of magnetic material which is secured at its center of rotation to a rotary shaft 101 in the wheel driving system and is formed with thirty-two equally spaced teeth along its circumference. A revolution detector 104 is mounted on the housing 103 for the wheel driving system at a position closely adjacent to the toothed disc 102 in a direction which is diametrically opposite to the latter. This revolution detector 104 is composed of a permanent magnet 105 and a coil 106 wound around the permanent magnet 105. The permanent magnet 105 and the coil 106 are housed in a suitable casing of non-magnetic material and the casing is mounted on the housing 103 so that one end of the permanent magnet 105 is disposed in close proximity to the outer periphery of the toothed disc 102. As the tooth portion of the toothed disc 102 passes through the magnetic field of the pernent magnet 105 with the rotation of the toothed disc 102, a variation takes place in the leakage flux of the permanent magnet 105 so that an electromotive force is induced in the coil 106. In the case of the illustrated example, one complete rotation of the toothed disc 102 produces thirty-two voltage pulses. Generally, an a.c. voltage signal at a frequency of $n \times N$ is obtained when the toothed disc 102 having n teeth rotates at a number of revolutions N per minute. This a.c. voltage signal appears across output terminals 107.

Figure 3:
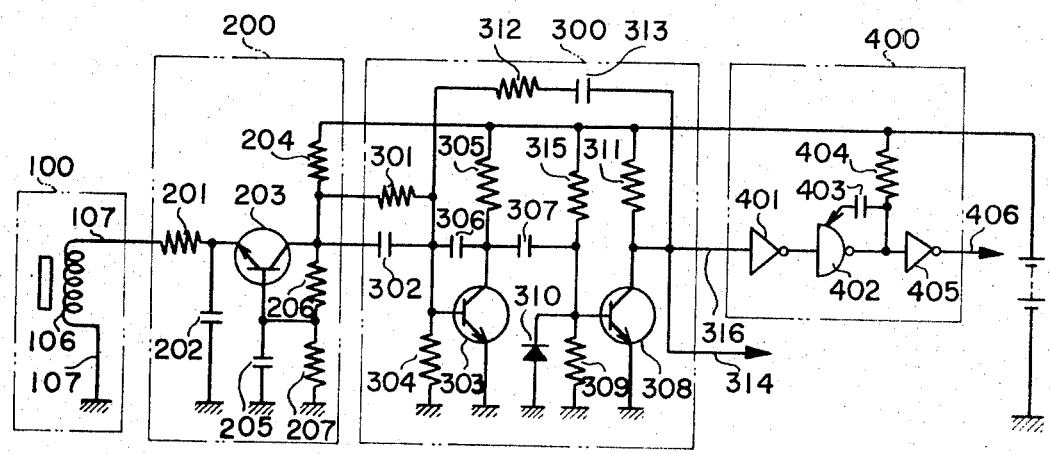
FIG. 3 is an electrical connection diagram showing in detail the structure of the blocks in FIG. 1.

FIG. 3 shows in detail the structure of the blocks shown in FIG. 1. Referring to FIG. 3, one of the output terminals 107 of the a.c. tachometer generator 100 is grounded, while the other output terminal 107 is connected directly to the amplifier 200. The amplifier 200 is composed of an input resistor 201, a noise preventive capacitor 202, an amplifying transistor 203, a load resistor 204 for the transistor 203, a by-pass capacitor 205, and bias resistors 206 and 207 for the transistor 203. The oscillator 300 is composed of a coupling resistor 301, a coupling compensating capacitor 302, a pair of oscillating transistors 303 and 308, a bias resistor 304 and a load resistor 305 for the transistor 303, a noise preventive capacitor 306, a coupling capacitor 307, bias resistors 309 and 315 and a load resistor 311 for the transistor 308, a reverse input level limiting diode 310 for the tranistor 308, a feedback resistor 312, and a feedback capacitor 313. The detector 400 for detecting an unusual condition such as a disconnection of short-circuit trouble occurring on the power generating coil 106 in the a.c. tachometer generator 100 is composed of INVERTER gates 401 and 405, a NAND gate 402, an integrating capacitor 403, and an auxiliary resistor 404. These gates 401, 402 and 405 are in the form of an integrated circuit.

The operation of the system of the present invention having such a structure will be described with reference to FIG. 3. The oscillator 300 is actually an astable multivibrator and is constructed to oscillate normally at a suitable low oscillation frequency. In the present invention, the vehicle speed is detected by the a.c. tachometer generator 100 and a frequency of 18.6 Hz corresponds to the unit vehicle speed of 1 kilometer per hour. Speed display means such as a speed meter is graduated in kilometers per hour. Thus, a free-running frequency lower than 18.6 Hz is practically suitable so that such frequency may not obstruct the display of the vehicle speed on the speed meter graduated in kilometers per hour. Taking the above into consideration, the oscillator 300 in the present embodiment is designed to oscillate at a free-running frequency of 10 Hz.

In operation, the voltage signal generated by the a.c. tachometer generator 100 is amplified by the amplifier 200 and the amplified voltage signal is applied to the oscillator 300 as a synchronizing signal. In response to the application of the voltage signal, the oscillator 300 having oscillated at its free-running oscillation frequency oscillates now at the same frequency as the frequency of the voltage signal in synchronism therewith. This oscillation frequency is representative of the revolutions of the rotary shaft in the wheel driving system and is applied by the output lead 314 to the speed meter to actuate the same. Although the voltage signal generated by the a.c. tachometer generator 100 has a sinusoidal waveform, the output signal delivered from the oscillator 300 and appearing on the output lead 314 has a rectangular waveform due to the fact that the oscillator 300 is an astable multivibrator as described above.

The output of the oscillator 300 is applied by a lead 316 to the detector 400 which detects disconnection or short-circuit of the power generating coil 106 of the a.c. tachometer generator 100. In the detector 400, the input applied from the oscillator 300 is inverted by the INVERTER gate 401, and the output of the INVERTER gate 401 is integrated by the integrator which is composed of the NAND gate 402, capacitor 403 and resistor 404. The integrated output delivered from the integrator is detected and inverted by the INVERTER gate 405 so that a signal indicative of the presence or absence of disconnection or short-circuit occurring on the power generating coil 106 of the a.c. tachometer generator 100 appears on the output lead 406 of the detector 400. More precisely, when the power generating coil 106 of the a.c. tachometer generator 100 is free from any disconnection or short-circuit troubles, the oscillator 300 oscillates normally and its oscillation output is integrated by the integrator. The output of the integrator is detected by the INVERTER gate 405 and an output signal of low level appears on the output lead 406 of the detector 400.

On the other hand, the oscillation of the oscillator 300 is forcedly stopped in the event of the occurrence of a disconnection or short-circuit trouble on the power generating coil 106 of the a.c. tachometer generator 100. When the oscillator 300 ceases to oscillate, no output appears from the integrator and an output signal of high level indicative of the occurrence of the disconnection or short-circuit trouble in the power generating coil 106 of the a.c. tachometer generator 100 appears on the output lead 406 of the detector 400 to be applied to means such as an alarm device. This operation will be described in more detail. The amplifier 200 operates as a class "A" amplifier in which the transistor 203 is grounded at the base thereof. The power generating coil 106 of the a.c. tachometer generator 100 is connected at one end thereof to ground and at the other end thereof to the emitter of the transistor 203, through the resistor 201. The collector of the transistor 203 is d.c.-coupled through the resistor 301 to the transistor 303 in the oscillator 300. The oscillator 300 is continuously oscillating when the power generating coil 106 of the a.c. tachometer generator 100 is trouble-free. When, however, a disconnection trouble occurs in the power generating coil 106, the emitter circuit of the transistor 203 is open-circuited and the transistor 203 is cut off, resulting in the complete conduction of the transistor 303 which is d.c.-coupled to the transistor 203 through the resistor 301. The oscillator 300 ceases to oscillate as a result of the complete conduction of the transistor 303. On the other hand, when a short-circuit trouble occurs in the power generating coil 106 of the a.c. tachometer generator 100, the emitter of the transistor 203 is shorted to ground through the resistor 201. This results in the complete conduction of the transistor 203 due to the loss of the class "A" amplification by the transistor 203. The transistor 303 is cut off and the oscillator 300 ceases to oscillate as in the case of disconnection trouble occurring on the power generating coil 106. Thus, the oscillation of the oscillator 300 is forcedly stopped when either disconnection trouble or short-circuit trouble occurs in the power generating coil 106 of the a.c. tachometer generator 100. When the oscillator 300 ceases to oscillate, the transistor 308 conducts and a signal of low level appears at the collector of the transistor 308, to be applied to the detector 400 by the lead 316. This signal is converted into a signal of high level by the INVERTER gate 401 and such a signal is applied to the NAND gate 402. However, the NAND gate 402 converts merely this signal of high level into a signal of low level since the integrator including the NAND gate 402 does not make any integrating operation due to the fact that the oscillator 300 is not oscillating. The signal of low level is applied from the NAND gate 402 to the INVERTER gate 405 to be converted into a signal of high level thereby. Thus, when a disconnection or short-circuit trouble occurs on the power generating coil 106 of the a.c. tachometer generator 100, a signal of high level is delivered from the INVERTER gate 405 to appear on the output lead 406.

The present invention is in no way limited to a specific embodiment as above described and many changes and modifications may be made therein without departing from the scope of the appended claim. For example, the present invention is applicable to the detection of the revolutions of various other rotary members in lieu of the vehicle speed.

It will be understood from the foregoing description that the present invention provides a device for measuring speed of rotation in which an a.c. tachometer generator generates a revolutions responsive voltage signal which is applied to an oscillator as a synchronizing signal, and the oscillator output representative of the revolutions is applied to means such as a speed meter. In the device, means are provided for forcedly stopping the oscillation of the oscillator in the event of occurence of a disconnection or short-circuit trouble on the power generating coil of the a.c. tachometer generator. A detector in the device detects the de-energization of the oscillator, hence the trouble occurring on the power generating coil of the a.c. tachometer generator. Further, the detector can detect such a trouble even when the generator is not operating.

We claim:

1. A device for measuring speed of rotation comprising an a.c. tachometer generator including a power generating coil for generating a voltage signal responsive to the revolutions of a rotary member, oscillation means oscillating in synchronism with the output of said generator when said generator is in operation and oscillating at a predetermined free-running frequency when said generator is not in operation, a first means connected in circuit between said a.c. generator and said oscillation means for de-energizing said oscillation means in the event of occurrence of a disconnection or short-circuit trouble on the power generating coil in said generator, and a second means connected in circuit with said oscillation means for detecting the appearance or disappearance of the oscillation output from said oscillation means.

* * * * *